United States Patent [19]

Hartwig

[11] Patent Number: 5,740,379
[45] Date of Patent: Apr. 14, 1998

[54] METHOD FOR GENERATING UNIQUE ADDRESSES FOR ELECTRICAL DEVICES FROM INPUT BIT PATTERNS BEING VERIFIABLE FOR ADMISSIBILITY

[75] Inventor: Reinhold Hartwig, Mantel, Germany

[73] Assignee: Siemens Aktiengesellschaft, München, Germany

[21] Appl. No.: 515,481

[22] Filed: Aug. 15, 1995

[30] Foreign Application Priority Data

Aug. 19, 1994 [DE] Germany .................. 44 29 433.6

[51] Int. Cl.⁶ .................. G06F 12/00; G06F 13/00
[52] U.S. Cl. .................. 395/284; 395/828; 395/829; 395/830
[58] Field of Search .................. 395/284, 282, 395/283, 823, 828, 829, 830

[56] References Cited

U.S. PATENT DOCUMENTS

| | | | |
|---|---|---|---|
| 4,727,475 | 2/1988 | Kiremidjian | 364/200 |
| 5,179,670 | 1/1993 | Farmwald et al. | 395/282 |
| 5,317,693 | 5/1994 | Cuenod et al. | 395/829 |
| 5,404,460 | 4/1995 | Thomsen et al. | 395/830 |
| 5,437,019 | 7/1995 | Brockmann | 395/284 |
| 5,530,895 | 6/1996 | Enstrom | 395/284 |
| 5,530,896 | 6/1996 | Gilbert | 395/284 |
| 5,553,245 | 9/1996 | Su et al. | 395/284 |

FOREIGN PATENT DOCUMENTS

| | | | |
|---|---|---|---|
| 0117954 | 9/1984 | European Pat. Off. | G06F 13/00 |
| 0153015 | 8/1985 | European Pat. Off. | G06F 12/06 |
| 0 336 708 | 10/1989 | European Pat. Off. | |
| 0 491 480 | 6/1992 | European Pat. Off. | |
| 0 586 715 | 3/1994 | European Pat. Off. | |
| 1483903 | 8/1977 | Germany | G06F 3/00 |

OTHER PUBLICATIONS

IBM Technical Disclosure Bulletin, Aug. 1979, "Selective Addressing of Devices Using Primitive Polynomial Transformations".

Primary Examiner—Jack B. Harvey
Assistant Examiner—Ario Etienne
Attorney, Agent, or Firm—Kenyon & Kenyon

[57] ABSTRACT

A method for assigning addresses for an assembly of an electrical device, provides that the assembly be supplied electronically with an input bit pattern (for example 101) consisting of a number of logical ones and a number of logical zeros. This input bit pattern (101) is then compared to admissible bit patterns (101, 110, 011). When the input bit pattern (101) conforms with one of the admissible bit patterns (101, 110, 011), an address (01) assigned to the input bit pattern (101) is determined, under which the assembly is then able to function in response to a bus system, and the assembly is then activated. The number of ones of all admissible bit patterns (101, 110, 011) are the same. On the basis of the input bit pattern (101), the assembly determines an output bit pattern (011) consisting of a number of logical ones and a number of logical zeros and making available this output bit pattern (011) for a downstream assembly.

8 Claims, 2 Drawing Sheets

FIG 1

METHOD FOR GENERATING UNIQUE ADDRESSES FOR ELECTRICAL DEVICES FROM INPUT BIT PATTERNS BEING VERIFIABLE FOR ADMISSIBILITY

BACKGROUND OF THE INVENTION

The present invention relates to a method for assigning addresses for an assembly of an electrical device.

EP 0 586 715 A1 discloses a method of this type, in which assemblies that are newly added to the system immediately signal the assembly that is in series but upstream to the added assembly. From this upstream assembly, they learn of their assignment in the device and, thus, also of their address. No further details are given about how this communication of addresses takes place.

A method for assigning addresses is disclosed by U.S. Pat. No. 4,727,475, in which modules that are arranged downstream from a central processing unit signal the central processing unit one after another, and the central processing unit assigns addresses to each of the modules, one after another. These methods are slow and unreliable.

The present invention is therefore directed to the problem of developing a method for assigning addresses that is simple, fast, reliable and, in particular, fail-safe.

SUMMARY OF THE INVENTION

The present invention solves this problem by providing that the assembly be supplied electronically by the one upstream assembly with an input bit pattern consisting of a number of logical ones and a number of logical zeros, that the input bit pattern be compared to admissible bit patterns, when the input bit pattern conforms with one of the admissible bit patterns, an address assigned to the input bit pattern is determined, under which the assembly is then able to function in response to a bus system, and the assembly is activated, that the number of ones of all admissible bit patterns is the same, and that on the basis of the input bit pattern, the assembly determines an output bit pattern consisting of a number of logical ones and a number of logical zeros and makes available this output bit pattern for another assembly.

DETAILED DESCRIPTION

Figure 1:
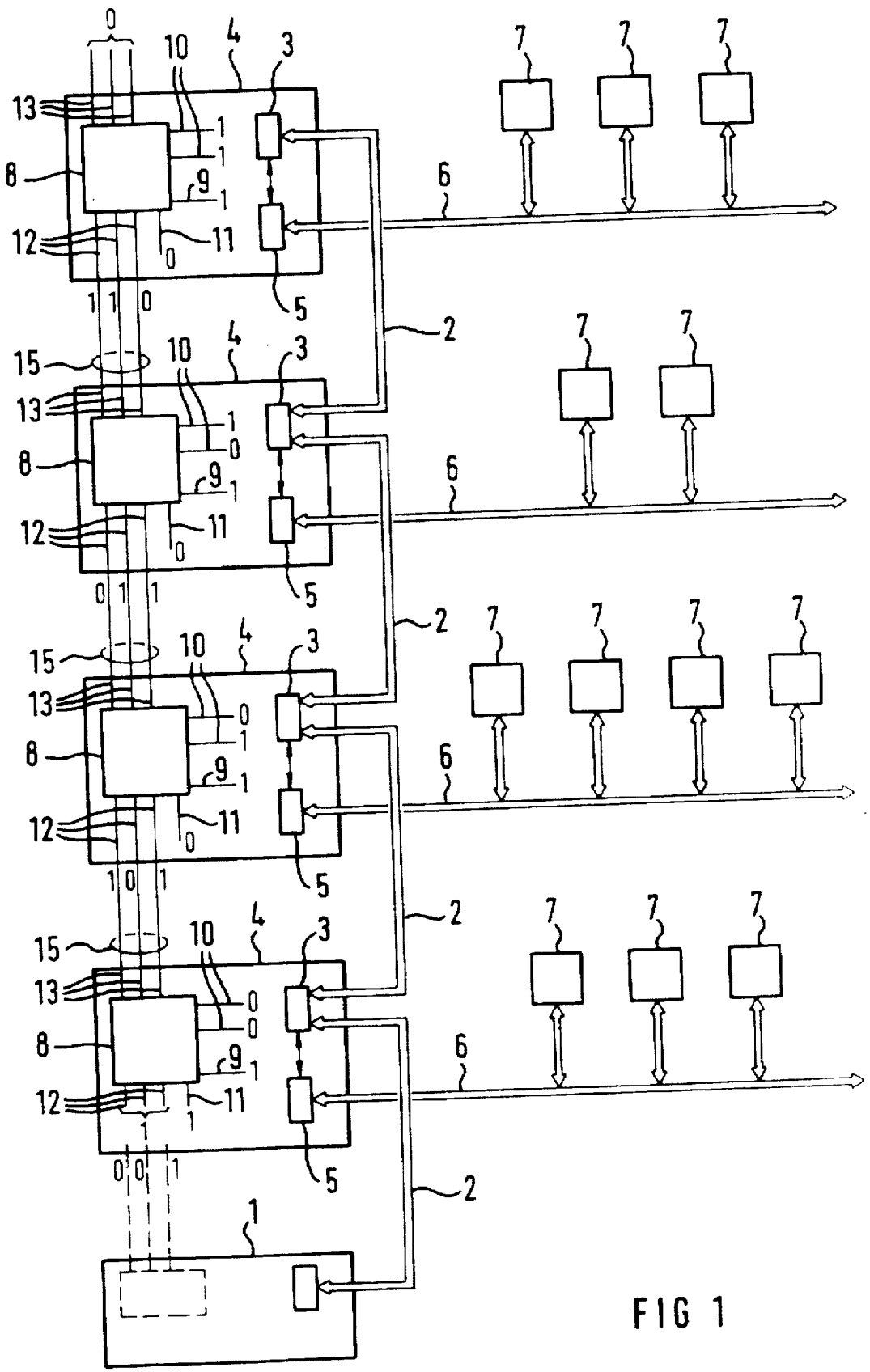
FIG. 1 depicts an electrical device.

In accordance with FIG. 1, the central processing unit 1 of a modular programmable controller is linked via the system bus 2 to the interfaces 3 of the intermediate modules 4 and can, therefore, access these modules. Thus, the programmable controller is the electrical device of the present invention. As indicated by the double arrows between the interfaces 3 and 5, in the case of certain accesses, it is possible to access the peripheral assemblies 7 of the individual strands via the interfaces 5 and the strand busses 6.

The intermediate modules 4 are the assemblies of the present invention. The intermediate modules 4 are only addressable when their evaluation circuits 8 output an activation signal via the activation lines 9. Furthermore, the evaluation circuits 8 output an address signal via the address lines 10. In this manner, by specifying a certain address, the central processing unit 1 can selectively access one of the intermediate modules 4 or the subassemblies 7, which are linked via the strand bus 6 to this intermediate module 4.

The activation of the intermediate modules 4 and the address assignment takes place according to the following scheme.

Figure 2:
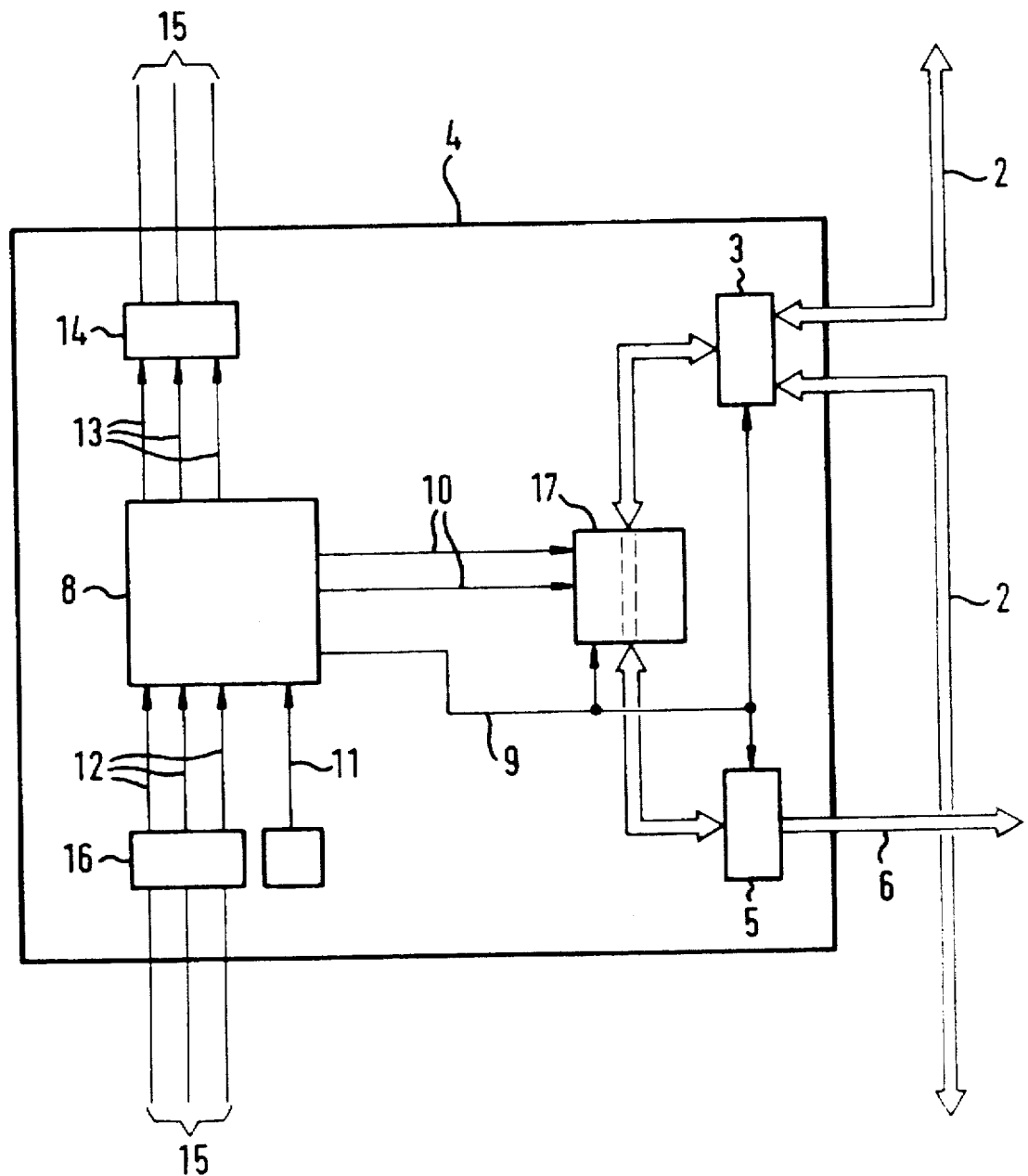
FIG. 2 depicts an assembly of the electrical device.

Each evaluation circuit 8—compare also FIG. 2—has four inputs 11, 12, the input 11 being permanently interconnected internally to the intermediate modules. In the case of the intermediate module 4, which is arranged closest to the central processing unit 1, the permanently wired input 11 is connected to a potential of, for example, +5 volts, in the case of the other intermediate modules 4, to ground. The potential of +5 volts is described in the following as logical 1 or simply as 1, the zero potential as logical 0 or 0.

The lowest of the four intermediate modules 4 differs from the other intermediate modules 4, in principle, already in that the input 11 is connected to 1 instead of to 0. Moreover, the other inputs 12 of this intermediate module 4 always receive a one signal.

As an assigned address, the evaluation circuit 8 always supplies the 00 via the address lines 10 independently of the values of the input signals. The signal output via the activation line 9 is only set to 1, however, when a 1 is likewise active at all inputs 11, 12, otherwise the activation signal is set to 0. An admissible bit pattern, namely 101, is applied in the same way to the outputs 13 only when all the inputs 11, 12 exhibit a one signal. Otherwise, the output bit pattern is 000.

The output bit pattern is supplied to the connector 14, from where it is fed as an input bit pattern via the cable 15 to the input connector 16 of the next intermediate module 4. The input bit pattern is compared by the evaluation circuit 8 to the admissible bit patterns stored in the evaluation circuit 8. When the input bit pattern has exactly two ones and exactly one zero, the input bit pattern is recognized as being valid and the intermediate module 4 is activated, thus the activation line 9 is connected to 1. For all those input bit patterns, which do not have two ones and one zero, the activation line is connected to 0, the assigned address is set to 00 and output as an output bit pattern 000.

Depending on whether the input bit pattern is 101, 011 or 110, the evaluation circuit 8 determines as an address 01, 10 or 11 assigned to the respective intermediate module 4. In the same way, the 011, the 110 or the 000 are output as an output bit pattern for the downstream intermediate module 4. The bit pattern 110 is thus the final bit pattern.

As is apparent from FIG. 2 in particular, the activation signal is fed via the activation line 9 both to the interfaces 3, 5, as well as to the logic circuit 17, so that these three elements only become active in the case of activation. The address signal is also supplied to the logic circuit 17, so that the logic circuit 17 knows its address, under which it functions in response to the central processing unit 1.

In practice, the leads of the cable 15 and of the system bus 2 are, of course, combined in a common cable. In the same way, the input-side part of the interface 3 is combined with the connector 16 to form a structural unit. The same applies to the output-side part of the interface 3 and to the connector 14.

Due to the fact that all admissible bit patterns have the same number of logical ones, namely two ones and one zero, both a cable short-circuiting as well as a cable breakage can be detected.

Finally, it should be mentioned that in place of a 2-out-of-3 bit pattern, of course other bit patterns could also be used, such as 2-out-of-6 bit patterns or 4-out-of-8 bit patterns.

In the above described exemplary embodiment, given correct addressing, four ones are supplied via the inputs 11, 12 to the intermediate module 4, which is arranged the closest to the central processing unit 1. Thus in the present case, this intermediate module 4 is not addressed in accordance with the method according to the invention. However, it would also be possible to consider the four inputs 11, 12 as a unit and to design all admissible bit patterns as 2-out-of-4 bit patterns. In this case, as shown with dotted lines in FIG. 1, the code 001, which is supplemented with the permanently wired 1 of the input 11 to form an input bit pattern with two ones, could be supplied to the intermediate module 4, which is arranged the closest to the central processing unit 1.

What is claimed is:

1. A method for assigning addresses to an assembly of an electrical device, comprising the steps of:
   a) supplying the assembly with an input bit pattern electronically from an upstream assembly, wherein the input bit pattern includes of a number of logical ones and a number of logical zeros;
   b) comparing the input bit pattern to a plurality of admissible bit patterns;
   c) determining an address assigned to the input bit pattern and activating the assembly when the input bit pattern matches one of the plurality of admissible bit patterns, whereby which the assembly can respond to a bus system;
   d) maintaining the number of ones in all of the plurality of admissible bit patterns the same;
   e) determining with the assembly an output bit pattern based on the input bit pattern, which output bit pattern includes a number of logical ones and a number of logical zeros; and
   f) making the output bit pattern available to a downstream assembly.

2. The method according to claim 1, wherein the output bit pattern does not match any of the plurality of admissible bit patterns, and in particular the number of ones of the output bit pattern differs from the number of ones of the admissible bit pattern when the input bit pattern does not match any of the admissible bit patterns.

3. The method according to claim 1:
   a) wherein there is a final bit pattern, which conforms with one of the plurality of admissible bit patterns;
   b) wherein, when the input bit pattern conforms to the final bit pattern, the output bit pattern does not conform with any of the plurality of admissible bit patterns, in which the number of ones of the output bit pattern differs from the number of ones of the admissible bit pattern; and
   c) wherein, when the input bit pattern conforms with one of the plurality of admissible bit patterns but not with the final bit pattern, the output bit pattern conforms with one of the plurality of admissible bit patterns but not with the input bit pattern.

4. The method according to claim 2:
   a) wherein there is a final bit pattern, which conforms with one of the plurality of admissible bit patterns;
   b) wherein, when the input bit pattern conforms to the final bit pattern, the output bit pattern does not conform with any of the plurality of admissible bit patterns, in which the number of ones of the output bit pattern differs from the number of ones of the admissible bit pattern; and
   c) wherein, when the input bit pattern conforms with one of the plurality of admissible bit patterns but not with the final bit pattern, the output bit pattern conforms with one of the plurality of admissible bit patterns but not with the input bit pattern.

5. An assembly of an electrical device, comprising:
   an evaluation circuit for receiving electronically an input bit pattern including of a number of logical ones and a number of logical zeros, said evaluation circuit comparing the input bit pattern to a plurality of admissible bit patterns, and when the input bit pattern conforms with one of the plurality of admissible bit patterns, outputting an address assigned to the input bit pattern, as well as an activation signal, wherein given an existing activation signal, the assembly is able to function in response to a bus system under the assigned address, the number of ones of all admissible bit patterns are the same, on the basis of the input bit pattern, the evaluation circuit determines an output bit pattern consisting of a number of logical ones and a number of logical zeros and makes this output bit pattern available for another assembly.

6. The assembly according to claim 5, wherein the output bit pattern does not conform with any of the admissible bit patterns, in particular the number of ones of the output bit pattern differs from the number of ones of the admissible bit pattern when the input bit pattern does not match any of the admissible bit patterns.

7. The assembly according to claim 5, wherein in the evaluation circuit, a final bit pattern is stored, which conforms with one of the plurality of admissible bit patterns, wherein, when the input bit pattern conforms to the final bit pattern, the output bit pattern does not conform with any of the plurality of admissible bit patterns, in which the number of ones of the output bit pattern differs from the number of ones of the admissible bit pattern, and wherein, when the input bit pattern conforms with one of the plurality of admissible bit patterns but not with the final bit pattern, the output bit pattern matches one of the admissible bit patterns but not the input bit pattern.

8. The assembly according to claim 6, wherein in the evaluation circuit, a final bit pattern is stored, which conforms with one of the plurality of admissible bit patterns, wherein, when the input bit pattern conforms to the final bit pattern, the output bit pattern does not conform with any of the plurality of admissible bit patterns, in which the number of ones of the output bit pattern differs from the number of ones of the admissible bit pattern, and wherein, when the input bit pattern conforms with one of the plurality of admissible bit patterns but not with the final bit pattern, the output bit pattern matches one of the admissible bit patterns but not the input bit pattern.

* * * * *